3,808,199
ORGANOPHOSPHORUS MODIFIED CELLULOSE NITRATE

Kuang-Farn Lin, Wilmington, Del., and Alfred E. Rheineck, Fargo, N. Dak., assignors to North Dakota State University Development Foundation, Fargo, N. Dak.
No Drawing. Filed Oct. 2, 1970, Ser. No. 77,739
Int. Cl. C08b 5/02, 5/04
U.S. Cl. 260—219
5 Claims

ABSTRACT OF THE DISCLOSURE

Soluble organophosphorus derivatives of cellulose nitrate prepared by reaction of cellulose nitrate containing free hydroxyl groups with a mono-functional organophosphoryl or phosphinyl chloride. The modified polymers have markedly improved fire resistance, retain substantially the original nitrogen content, are soluble in most lacquer solvents and are capable of forming durable films as decorative and functional coatings.

---

This invention relates to organophosphorus modified cellulose nitrate in soluble form and applicable as a film former in functional and decorative coatings.

Cellulose nitrate, commonly known as nitrocellulose, has been used as one of the major film formers in protective and decorative coatings. It offers many valuable advantages, such as fast drying, high gloss, hard and tough films, and excellent compatibility with various modifying resins, plasticizers and other additives. However, it suffers from the major disadvantage of high flammability. So far, there has been no satisfactory solution offered to reduce its potential fire hazard, particularly in storage and handling of this polymer in bulk form. The most common practice has been to keep it in water-wet form. This is not satisfactory from the user's point of view, because dehydration is necessary before it can be effectively used. Inorganic pigments such as titanium dioxide and carbon black have been incorporated into the dry flakes or chips of cellulose nitrate, but this automatically excludes the material from use in clear coating compositions, which is a major outlet. Halogen and/or phosphorus containing plasticizers or other forms of modifiers have been used in nitrocellulose lacquer formulations to reduce flammability. However, this approach offers no solution to the safe storage and handling of the bulk polymers.

There have been many processes described in the literature for the preparation of phosphorus containing derivatives of cellulose, none of which was aimed at modifying cellulose nitrate for reducing its potential fire hazard to give proudcts applicable for coating purposes. For instance, in U.S. Pats. No. 1,962,827 and No. 1,962,828 to Malm and Waring, cellulose or its derivatives, such as cellulose nitrate, were treated with a mixture containing phosphorus oxychloride and an organic base at a temperature of 60° to 65° C. for several days to give phosphate esters of the cellulose or cellulose derivatives insoluble in practically all organic solvents and also insoluble in cuprammonium solution. In U.S. Pat. No. 2,759,924 to Touey, cellulose was treated with an esterifying solution consisting of a phosphoric acid and phosphorus pentaoxide in a diluent consisting essentially of a liquid alcohol which is miscible with the acid. The product obtained was a cellulose acid phosphate soluble in water but not in the usual organic solvents. This patent is limited to cellulose. No attempt was reported regarding cellulose nitrate. Martin and Kelly in U.S. Pat. No. 2,981,730 disclosed the modification of carboxylic esters of cellulose containing free hydroxyl groups with organic chlorophosphorus compounds in a solvent and in the presence of a hydrogen chloride acceptor. The products showed decreased tendency toward flammability and advantages in the application to non-porous membranes.

The objectives of the present invention are (1) to provide new and useful organophosphorus derivatives of cellulose nitrate, which retain most of the advantages of cellulose nitrate as a coating material, but with marked improvement in reduced flammability characteristics, (2) to provide such novel cellulose nitrate derivatives in soluble form to enable the effective use of such polymers, and (3) to provide a method for preparing such organophosphorus cellulose nitrate derivatives.

According to the present invention, cellulose nitrate containing free hydroxyl groups is dissolved in anhydrous solvents, such as pyridine or mixtures of pyridine and dioxane, or other organic solvents which are inert to the reactants (cellulose nitrate and acid chlorides of organophosphorus acids), including ketones, esters, ethers, etc. or a mixture of solvents, with solubility parameter within the range of 7.8–14.7 $(cal./ml.)^{1/2}$ capable of dissolving cellulose nitrate. Mono-functional organophrous reagents, such as dialkyl or diaryl phosphoryl or phosphinyl chlorides are added, preferably in the form of a complex with a tertiary amine, such as pyridine, to the solution at room temperature or under near-freezing cooling. Other than pyridine, tertiary amines, such as triethylamine, tripropylamine, N-methyl piperidine, N,N-dimethylaniline, etc., which can serve as acid acceptor, may be used. And exothermic reaction takes place between the phosphorus reagent and the cellulose nitrate. An adequate degree of modification is normally reached in two hours or less. The solution is then precipitated in water or other non-solvent liquid. The resultant polymer product contains 1 percent or more of phosphorus based on the total weight of the polymer. It retains the general solubility characteristics of the parent polymer, cellulose nitrate. It also exhibits similar film forming and film properties as cellulose nitrate. However, the flammability of the new product is greatly reduced as compared to the unmodified cellulose nitrate, or even exhibits self-extinguishing or fire-retardant characteristics. The thermal stability of the modified product is also significantly improved over the unmodified polymer.

Cellulose nitrates with varying contents of free hydroxyl groups can all be used in the process of this invention. Thus, both the regular solubility, RS type and spirit soluble, SS type of cellulose nitrate have been successfully modified. There has been little or no sign of denitration taking place during the modification process. Neither is there any limitation on the molecular weight of the cellulose nitrate to be treated in this modification, since there was virtually no sign of degradation according to the intrinsic viscosity measurement.

The organophosphorus reagents which can be generally represented by the chemical formulae

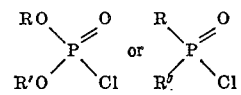

in which R and R' represent identical or different alkyl or aryl groups, are equally useful in the modification process. The R and R' groups in the structural formulae include all alkyl groups containing 1–12 carbon atoms, and aryl groups containing 6–12 carbon atoms with 1–2 aromatic ring structures. Either phosphoryl or phosphinyl chlorides may be used, the reaction of the present invention being analogous to that of U.S. Pat. No. 2,981,730, where both phosphoryl and phosphinyl chloride are used to react with carboxylic esters of cellulose and give organophosphorus derivatives, except that the present reaction uses nitric esters of cellulose instead.

The phosphorus content of the modified product varies depending on the amount of reagent used, reaction time, and temperature. It is deemed necessary to have a phosphorus content of 2 percent or more, preferably between 2.5 and 4 percent based on the total weight of the polymer in order to exhibit adequate flame resistance when the R and R' groups in the aforementioned reagents are alkyl groups with 4 or less carbon atoms. When longer chain alkyl or aryl reagents are used, adequate fire resistance can be realized at a phosphorus content of 1.5 percent or more, preferably between 2 to 4 percent based on the total weight of the polymer. The reaction may be carried out in a non-solvent inert liquid medium, such as hexane or other hydrocarbons.

The following examples are given by way of illustration and are not intended to limit the scope of this invention:

EXAMPLE 1

Ten grams of anhydrous nitrocellulose having an average nitrogen content of 11.0 percent and in intrinsic viscosity of 0.54 was dissolved in 90 ml. of anhydrous pyridine under a nitrogen atmosphere. A mixture of 13.7 grams of diethyl phosphoryl chloride and 5 ml. of dry pyridine was added gradually into the polymer solution. The exothermic nature of the reaction raised the solution temperature from 24.2° to 29° C. After 35 minutes 10 ml. of n-butanol was added to quench the reaction. The reaction mixture was discharged into a large volume of distilled water, whereupon a white precipitate formed. The precipitate was redissolved in acetone and re-precipitated in water. It was then washed thoroughly with distilled water, and dried in vacuo.

The dried polymer contained 2.26 percent P. It will not support burning. It has solubility characteristics similar to those of the cellulose nitrate from which it was derived. The nitrogen content was 10.2 percent and the intrinsic viscosity was 0.48.

EXAMPLE 2

Five grams of anhydrous nitrocellulose, identical to that used in Example 1 was dissolved in 43 ml. of anhydrous pyridine under an inert atmosphere. The solution was then kept in an ice water bath. A mixture of 6.9 grams of diethyl phosphoryl chloride and 7.0 ml. of anhydrous pyridine was gradually added to the nitrocellulose solution with constant stirring. A very small amount of absolute ethanol was added periodically to avoid gelation, which might occur if the di- or poly-functional impurities in the phosphorylation reagent were not effectively removed or neutralized. The temperature was kept around 3° C. The addition of the phosphorylation reagent was complete in two hours. The final mixture product was a straw-colored solution. The product was then gradually precipitated in water. The white fibrous precipitate was filtered, thoroughly washed with water, and dried in vacuo at 45° C. The final product contains 3.38 percent, P, 7.9 percent N, and the intrinsic visosity was 0.24. Its solubility characteristics were similar to that of the unmodified cellulose nitrate. The solution yielded a dry film soon after it was cast on a steel plate. The film was hard, had excellent mar resistance, and excellent adhesion to the steel plate. Films of this polymer did not support combustion when exposed to an open flame.

EXAMPLE 3

Five grams of cellulose nitrate, identical to that used in the previous examples, was dissolved in 50 ml. of anhydrous pyridine. A mixture of 12.8 grams of di-p-tolyl phosphoryl chloride and 10 ml. of anhydrous pyridine was used as the phosphorylation reagent. This was slowly added to the cellulose nitrate solution under inert atmosphere in an ice water bath. The reaction was allowed to proceed at about 3° C. for 2 hours with periodic addition of drops of absolute ethanol to prevent gelation. The reaction product was graduadlly precipitated in chloroform to remove the excess reagent and the ethyl ester formed between the phosphoryl chloride and the ethanol. The white precipitate was filtered, washed with water, re-dissolved in acetone, and reprecipitated from water. It was filtered, and washed thoroughly with water and dried in vacuo.

The polymer recovered contains 2.43 percent of phosphorus and had an intrinsic viscosity of 0.47. The butyl acetate solution of this polymer dried quickly to form a very hard and tough, clear film with a light yellow tint. It exhibited excellent mar-resistance and excellent adhesion to the steel plate. When the film was subjected to an open flame, it smoked and charred, but did not support combustion.

EXAMPLE 4

Nitrocellulose, identical to those used in the previous examples, in the amount of 5.4 grams was dissolved in a mixture of 38.6 ml. of anhydrous p-dioxane and 10.0 ml. of anhydrous pyridine under inert atmosphere. A mixture of 12.2 grams of dioctyl phosphoryl chloride and 12.2 grams of anhydrous p-dioxane was gradually added to the above solution. As the reaction proceeded, the phosphorus ester formed was not completely soluble in the medium and phase separation occurred. The viscous bottom layer contained the swollen polymer. This was separated from the light, clear supernatant serum after the mixture was allowed to react for about 70 minutes. At this time, the exotherm of the reaction subsided, and the temperature dropped from the maximum of 29° C. to room temperature of 25° C. The polymer phase was diluted with about 10 ml. of acetone to reduce the viscosity. It was then precipitated in water, filtered, washed thoroughly with water, dried, re-dissolved in acetone, re-precipitated in water, washed and dried in vacuo. The almost white polymer product was found to contain 1.67 percent P, 8.4 percent N and its intrinsic viscosity was 0.75. Its solution gave a brownish film on steel plate. The film was hard, had good mar-resistance and good adhesion to steel, when subjected to an open flame, the film smoked and charred but failed to ignite.

EXAMPLE 5

Dry nitrocellulose in the amount of 5.4 grams (approx. 20 m.eq.) was mixed with 25 ml. of dry dioxane in a 250 ml. 3-neck flask equipped with a nitrogen inlet until almost dissolved. Then 20 ml. of dry pyridine was added when a clear solution was formed. A mixture of 23.25 grams of d-phenylphosphoryl chloride (86.5 m.eq.) and 5 ml. of dry pyridine were added through a dropping funnel. An exothermic reaction started as soon as the di-phenylphosphoryl chloride-pyridine mixture met the nitrocellulose solution. The peak temperature was 34° C. from the initial 27° C. The addition took 10 minutes to complete. A phase separation was observed at midpoint of the adding process when the maximum temperature was reached. Twenty minutes after the addition was complete, the two phases, a solution phase and a swollen gel phase, were separately precipitated in benzene.

The soluble portion formed a light yellow precipitate soluble in 1:1 butyl acetate-ethanol mixture. The precipitate dissolved in the mixed solvent was then reprecipitated in water. A white precipitate formed and this was washed thoroughly with water and dried in vacuo at 45° C. It contained 1.38 percent P, and had an intrinsic viscosity of 0.24. The film exhibited only moderate fire retardancy.

The gel portion did not precipitate in benzene. It remained as a tacky, swollen gel. The solvent was pressed out of the gel followed by soaking in 1:1 ethanol-butyl acetate mixture overnight. Part of it dissolved and this solution was separated from the swollen gel. Both phases were precipitated separately in distilled water. The solution yielded a white precipitate after thoroughly washing with water and drying in vacuo at 45° C. The phosphorus content was found to be 2.27 percent.

The solvent in the insoluble hard core gel had to be squeezed out. A white, soft, but tough structure was the result. After thoroughly washing with water and drying, the product was found to contain 2.04 percent P. All fractions showed similar IR absorption patterns.

Owing to the excellent solubility of the new organophosphorus derivatives of cellulose nitrate in almost all of the organic solvents commonly used in nitrocellulose lacquer compositions, their excellent film forming capacity and film integrity, and the most remarkable, the exceptionally high resistance to burning shown by these new polymers, their advantages as coating materials are obvious.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A process for the preparation of a soluble organophosphorus modified cellulose nitrate which comprises:
   (A) reacting a nitrate ester of cellulose containing free hydroxyl groups with a mono-functional organophosphorus compound selected from the class consisting of di-substituted phosphoryl chloride having the general formula of:

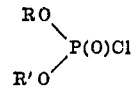

and di-substituted phosphinyl chloride having the general chemical formula of:

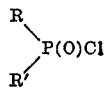

in which the R and R' are selected from the class consisting of alkyl and aryl groups, and complexes of said mono-functional organophosphorus compounds with a tertiary amine, in a mutual solvent under anhydrous conditions at a temperature between about near-freezing and ambient temperature in the presence of a hydrogen halide acceptor, and
   (B) periodically adding small amounts of a mono-functional organic hydroxyl compound to avoid gelation due to any excessive functionality present in the organophosphorus reagent as impurities.

2. The process of claim 1 wherein the cellulose nitrate has nitrogen content between 10 percent and 12.5 percent.

3. The process of claim 1 wherein the mono-functional organophosphorus chloride is diethyl phosphoryl chloride.

4. The process of claim 1 wherein the mono-functional organophosphorus chloride is diphenyl phosphoryl chloride.

5. The process of claim 1 wherein the phosphorus content is at least 1 percent based on the weight of the organophorphorus modified cellulose nitrate.

References Cited

UNITED STATES PATENTS

| | | | |
|---|---|---|---|
| 2,008,986 | 7/1935 | Malm et al. | 260—219 |
| 2,981,730 | 4/1961 | Martin et al. | 260—219 |
| 3,565,886 | 2/1971 | Clermont | 260—219 |
| 1,962,827 | 6/1934 | Malm et al. | 260—219 |
| 1,962,828 | 6/1934 | Malm et al. | 260—219 |
| 2,759,924 | 8/1956 | Touey | 260—219 |

FOREIGN PATENTS

| | | | |
|---|---|---|---|
| 415,408 | 8/1934 | Great Britain | 260—223 |

DONALD E. CZAJA, Primary Examiner

R. W. GRIFFIN, Assistant Examiner

U.S. Cl. X.R.

106—15 FP, 195; 117—132 R, 166; 260—223

UNITED STATES PATENT OFFICE
CERTIFICATE OF CORRECTION

Patent No. 3,808,199  Dated April 30, 1974

Inventor(s) Kuang-Farn Lin et al

It is certified that error appears in the above-identified patent and that said Letters Patent are hereby corrected as shown below:

Column 1, line 52, "proudcts" should be --products--.

Column 2, line 21, "organophosphrous" should be --organophosphorus--.

Column 4, line 1, "graduadlly" should be --gradually--.

Claim 1, line 7, after "general", --chemical-- is omitted.

Signed and sealed this 10th day of September 1974.

(SEAL)

McCOY M. GIBSON, JR.
Attesting Officer

C. MARSHALL DANN
Commissioner of Patents